(12) United States Patent
Chui et al.

(10) Patent No.: US 7,601,571 B2
(45) Date of Patent: Oct. 13, 2009

(54) METHODS OF MANUFACTURING INTERFEROMETRIC MODULATORS WITH THIN FILM TRANSISTORS

(75) Inventors: Clarence Chui, San Jose, CA (US); Stephen Zee, San Jose, CA (US)

(73) Assignee: IDC, LLC, Pleasanton, CA (US)

( * ) Notice: Subject to any disclaimer, the term of this patent is extended or adjusted under 35 U.S.C. 154(b) by 47 days.

(21) Appl. No.: 11/837,140

(22) Filed: Aug. 10, 2007

(65) Prior Publication Data

US 2007/0275491 A1    Nov. 29, 2007

Related U.S. Application Data

(62) Division of application No. 10/883,902, filed on Jul. 2, 2004, now Pat. No. 7,256,922.

(51) Int. Cl.
H01L 21/00 (2006.01)
H01L 21/84 (2006.01)
(52) U.S. Cl. .................. 438/149; 438/197; 438/70; 257/E21.32; 257/E21.316; 257/E21.332; 257/E21.411
(58) Field of Classification Search .............. 438/70, 438/149, 197, 311, 723, 743, 756, 753
See application file for complete search history.

(56) References Cited

U.S. PATENT DOCUMENTS

| 4,954,789 | A | 9/1990 | Sampsell |
| 5,055,833 | A | 10/1991 | Hehlen, deceased et al. |
| 5,227,900 | A | 7/1993 | Inaba et al. |
| 5,784,189 | A | 7/1998 | Bozler et al. |
| 6,040,937 | A | 3/2000 | Miles |
| 6,381,022 | B1 | 4/2002 | Zavracky |
| 6,574,033 | B1 | 6/2003 | Chui et al. |
| 6,674,562 | B1 | 1/2004 | Miles |
| 6,680,792 | B2 * | 1/2004 | Miles .......................... 359/291 |
| 6,781,643 | B1 | 8/2004 | Watanabe et al. |
| 6,903,860 | B2 * | 6/2005 | Ishii ........................... 359/290 |
| 7,123,216 | B1 | 10/2006 | Miles |

(Continued)

FOREIGN PATENT DOCUMENTS

EP    0295802 A    12/1988

(Continued)

OTHER PUBLICATIONS

Miles, MEMS-based interferometric modulator for display applications, Part of the SPIE Conference on Micromachined Devices and Components, vol. 3876, pp. 20-28 (1999).

(Continued)

*Primary Examiner*—David Nhu
(74) *Attorney, Agent, or Firm*—Knobbe Martens Olson & Bear LLP

(57) ABSTRACT

A modulator has a transparent substrate with a first surface. At least one interferometric modulator element resides on the first surface. At least one thin film circuit component electrically connected to the element resides on the surface. When more than one interferometric element resides on the first surface, there is at least one thin film circuit component corresponding to each element residing on the first surface. A method of manufacturing interferometric modulators with thin film transistors is also disclosed.

9 Claims, 14 Drawing Sheets

U.S. PATENT DOCUMENTS

| | | | |
|---|---|---|---|
| 7,161,728 | B2 | 1/2007 | Sampsell et al. |
| 7,256,922 | B2 | 8/2007 | Chui et al. |
| 7,446,926 | B2 * | 11/2008 | Sampsell .................. 359/290 |
| 2001/0034075 | A1 | 10/2001 | Onoya |
| 2002/0015215 | A1 | 2/2002 | Miles |
| 2002/0024711 | A1 | 2/2002 | Miles |
| 2004/0026757 | A1 | 2/2004 | Krane et al. |
| 2004/0051929 | A1 | 3/2004 | Sampsell et al. |
| 2005/0122560 | A1 | 6/2005 | Sampsell et al. |
| 2006/0066935 | A1 | 3/2006 | Cummings et al. |

FOREIGN PATENT DOCUMENTS

| | | |
|---|---|---|
| EP | 1345197 A | 9/2003 |
| EP | 1381023 A | 1/2004 |
| JP | 2002 062493 | 2/2002 |
| JP | 2004-29571 | 1/2004 |
| WO | WO 03/007049 A1 | 1/2003 |
| WO | WO 03/073151 | 9/2003 |
| WO | WO 2004/026757 | 4/2004 |

OTHER PUBLICATIONS

Patent Abstracts of Japan, vol. 2002, No. 6, Jun. 4, 2002-& JP 2002 062493 A (Canon Inc), Feb. 28, 2002.

Patent Abstracts of Japan, vol. 2002, No. 10, Oct. 10, 2002 & JP 2002 175053 A (Sony Corp), Jun. 21, 2002.

Patent Abstracts of Japan, vol. 2003, No. 12, Dec. 5, 2003 & JP 2004 004553 A (Seiko Epson Corp), Jan. 8, 2004.

Office Action received Feb. 14, 2008 in Chinese App. No. 200580021873.X.

Official Communication in European App. No. 05763492.5, dated Apr. 11, 2008.

Miles et al., 5.3: Digital Paper™; Reflective displays using interferometric modulation, SID Digest, vol. XXXI, 2000 pp. 32-35.

ISR and WO for PCT/US05/022592 filed Jun. 24, 2005.

IPRP for PCT/US05/022592 filed Jun. 24, 2005.

Office Action dated Sep. 11, 2006 in U.S. Appl. No. 10/883,902.

Office Action dated Aug. 23, 2005 in U.S. Appl. No. 10/883,902.

Second Office Action received Aug. 18, 2008 in Chinese App. No. 200580021873.X.

* cited by examiner

METHODS OF MANUFACTURING INTERFEROMETRIC MODULATORS WITH THIN FILM TRANSISTORS

CROSS REFERENCE TO RELATED APPLICATIONS

This application is a divisional of U.S. application Ser. No. 10/883,902, filed Jul. 2, 2004, entitled "INTERFEROMETRIC MODULATORS WITH THIN FILM TRANSISTORS", now U.S. Pat. No. 7,256,922, which is incorporated by reference hereby in its entirety.

BACKGROUND

Interferometric modulators, such as the iMoD™, modulate light by controlling the self-interference of light that strikes the front surface of the modulator. These types of modulators typically employ a cavity having at least one movable or deflectable wall. This deflectable wall moves through planes parallel to the front wall of the cavity-the wall that is first encountered by light striking the front surface of the modulator. As the movable wall, typically comprised at least partly of metal and highly reflective, moves towards the front surface of the cavity, self-interference of the light within the cavity occurs, and the varying distance between the front and movable wall affects the color of light that exits the cavity at the front surface. The front surface is typically the surface where the image seen by the viewer appears, as interferometric modulators are usually direct-view devices.

The movable wall moves in response to an actuation signal generated by addressing circuitry that sends the signal to the movable element. The addressing circuitry is generally manufactured off-chip from the array of movable elements. This is in part because the substrate upon which the interferometric modulators are manufactured is transparent, such as plastic or glass.

Thin film transistors may be manufactured on transparent substrates. Integrating thin film transistors with the interferometric modulator array may provide an interferometric modulator with extended functionality.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of the Embodiments" one will understand how the features of this invention provide advantages over other display devices.

In one embodiment, a method of manufacturing an interferometric modulator with thin film semiconductor circuit components comprises depositing a material layer over a transparent substrate, and patterning and etching the first material to form a portion of at least one interferometric modulator element and a portion of at least one thin film semiconductor circuit component.

BRIEF DESCRIPTION OF THE DRAWINGS

The invention may be best understood by reading the disclosure with reference to the drawings, wherein.

DETAILED DESCRIPTION OF THE EMBODIMENTS

Figure 1A:
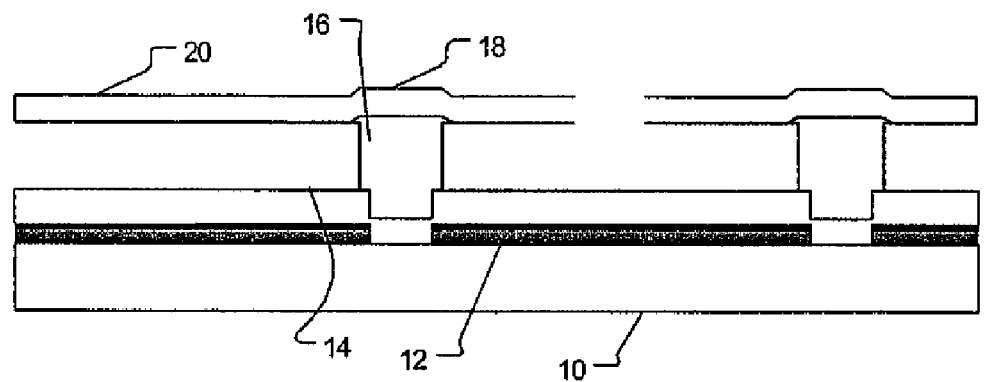
FIGS. 1a and 1b show embodiments of an interferometric modulator.
Figure 1B:
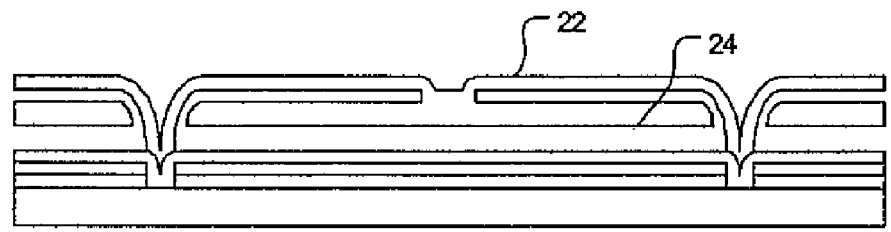

FIGS. 1a and 1b show alternative embodiments of an interferometric modulator. As mentioned previously, interferometric modulators employ a cavity having at least one movable or deflectable wall. As the wall 20 of FIG. 1a, typically comprised at least partly of metal, moves towards a front surface 12 of the cavity, interference occurs that affects the color of light viewed at the front surface. The front surface is typically the surface where the image seen by the viewer appears, as the iMoD is a direct-view device. The front surface 12 may have a stack of materials that form the optical stack 14, also referred to as the first mirror. The movable wall 20 is offset from the optical stack by a post 16.

In the embodiment of FIG. 1a, the movable element 20 is part of a membrane that covers the posts 16, with a slightly elevated portion of the membrane 18. In an alternative embodiment, the movable element 24 is suspended over the cavity by the supports 22 that also form the posts. The embodiments of the invention as described herein apply to both of these architectures, as well as many other types of MEMS devices manufactured from thin film processes.

In a monochrome display, such as a display that switches between black and white, one iMoD element might correspond to one pixel. In a color display, three iMoD elements may make up each pixel, one each for red, green and blue. The individual iMoD elements are controlled separately to produce the desired pixel reflectivity. Typically, a voltage is applied to the movable wall, or element, of the cavity, causing it be to electrostatically attracted to the front surface that in turn affects the color of the pixel seen by the viewer.

Addressing circuitry and drivers determine which elements have a voltage applied to move them towards the front surface. The addressing circuitry will generally include transistors, with one or more transistors corresponding to each element on the modulator array. Currently, the transistors are manufactured off-chip from the modulator element. However, with the use of thin-film transistors, it is possible to manufacture the transistors on the substrate. In addition, as most MEMS devices may be manufactured from thin films, it is possible to integrate the manufacture of thin film transistors with the manufacture of MEMS devices.

Figure 2:
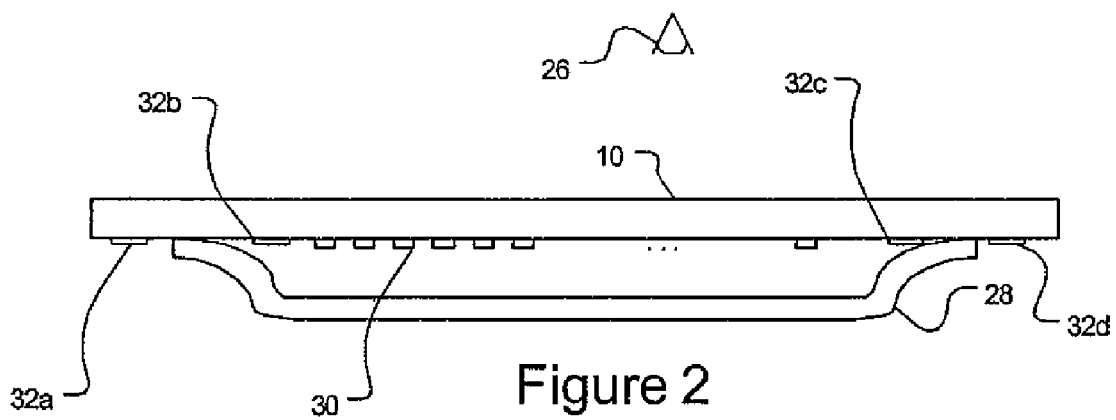
FIG. 2 shows a side view of an interferometric modulator having integrated thin film transistors.

FIG. 2 shows a side view of an interferometric modulator device. The modulator has an array of individually controlled, movable elements such as 30, manufactured on the transparent substrate 10. As part of the packaging process, the modulator array is enclosed with a back plate 28. As can be seen here, there are several portions of the transparent substrate 10 that could be used for manufacture of thin film transistors that would not be seen by the viewer 26.

Regions 32a and 32d are 'outside' the modulator, where the term 'outside' refers to being on the opposite side of the back plate or other packaging structure from the modulator array. This would not typically be where the transistors would go. The possibility of damaging the transistor leads between the modulator elements and the transistors with the back plate mounting processes may be too great. Typically, the transistors would be manufactured directly adjacent the modulator array, where directly adjacent means that they are manufactured on portions of the substrate not used for the modulator array, but inside the back plate. Regions 32b and 32c are examples of such a location. In addition, the transistors may be manufactured side by side with the modulator elements, such as one transistor next to each element.

As mentioned previously, it is possible to manufacture thin film transistors using materials and processes that are very compatible with the manufacture of MEMS devices, such as the interferometric modulators mentioned above. Looking at FIG. 2, it can be seen that the modulator array is manufactured on the 'back' of the transparent substrate 10. In the process flow diagrams of FIGS. 3a-3l, the transparent substrate is shown 'upside down' from the view of FIG. 2. The manufacture of the modulator will appear to be on top of the substrate.

In addition, it is possible to manufacture other semiconductor, thin film, circuit components may be manufactured integrated with the modulator manufacturing process flow, or in series with it. An example of a component other than a transistor would be thin film diodes. While the examples below discuss the manufacture of thin film transistors, any thin film semiconductor circuit component may be used.

Figure 3A:
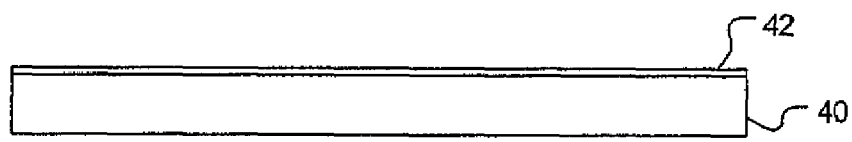
FIGS. 3a-3l show embodiments of an integrated process flow for thin film transistors.
Figure 3B:
Figure 4A:
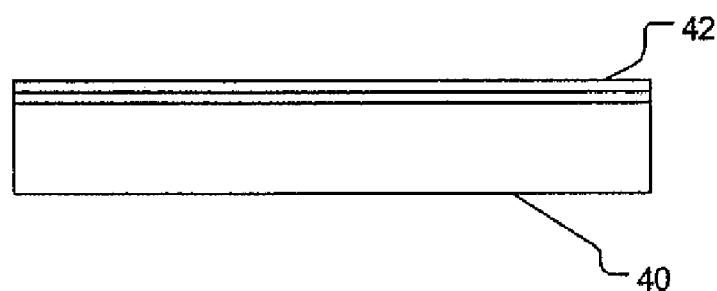
FIGS. 4a-4h show embodiments of an integrated process flow for an interferometric modulator with thin film transistors.
Figure 4B:
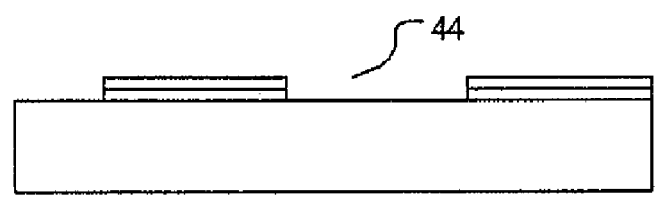

In FIG. 3a, a first material layer 42 has been deposited. This material may be used to form the gates for the thin film transistors and the optical stack of the interferometric modulator, as shown in FIG. 4a. The first material may be metal. In FIG. 3b, the first material has been patterned and etched to remove selected portions such as 44 of the material. This can form the gates of the transistors. The optical stack for the modulators may be formed into rows as shown in FIG. 4b.

Figure 3C:
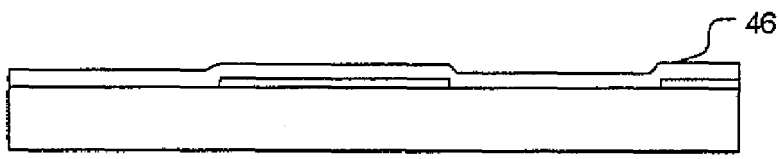
Figure 4C:
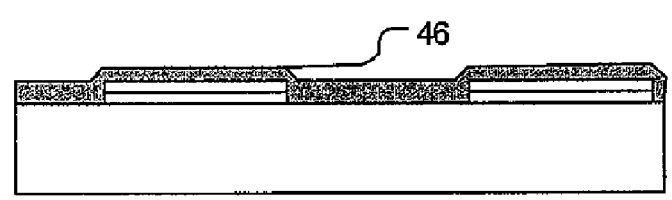

In FIG. 3c, a first oxide layer 46 has been deposited. The material used for the oxide may be the same material used to form the optical stack dielectric for the modulators and the gate oxide for the transistors, shown in FIG. 4c. The selection of the material for the oxide can be adjusted for both the operation of the modulator and for compatibility with the further processes used to form the elements. For example, it is useful if the oxide material used is optically transparent for use in the modulator.

Figure 3D:
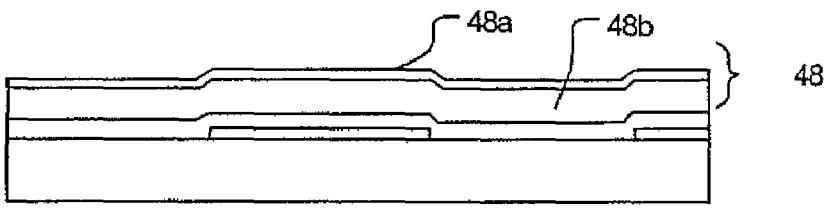
Figure 4D:
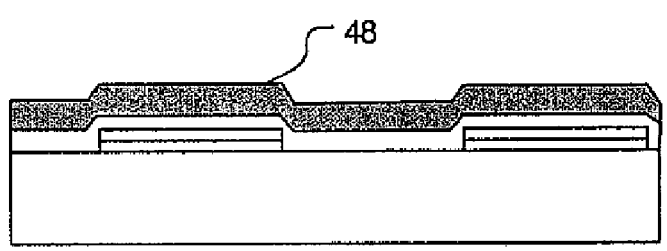

In FIG. 3d, a first sacrificial layer is deposited for the modulators. This layer will be etched to form the cavity, after the formation of other parts of the modulator is completed. The sacrificial layer 48 of FIG. 4d may actually be formed from two layers, a first layer of amorphous silicon and then a doped layer of amorphous silicon, as shown at 48a and 48b of FIG. 3d. The use of amorphous silicon and doped amorphous silicon as the sacrificial layer is compatible with the processing of the modulator, and is used in the processing of the thin film transistors. As mentioned above the dielectric layer 46 may be selected to be compatible with further processing, so the dielectric/oxide would be selected to be compatible with amorphous silicon.

Figure 3E:
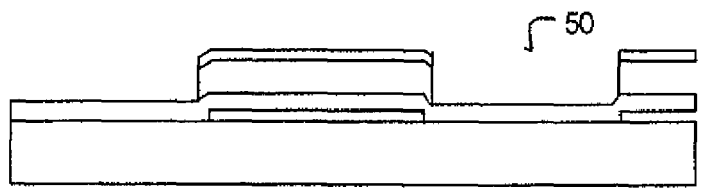
Figure 3F:
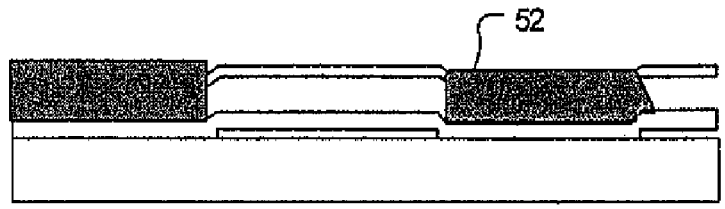
Figure 4E:
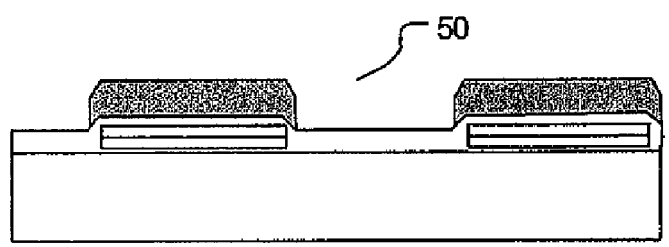
Figure 4F:
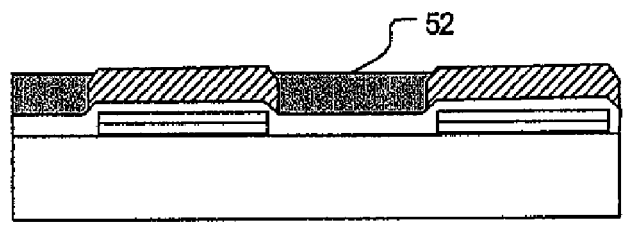

In FIG. 3e, the sacrificial layer is patterned and etched to form post holes similar to 50 for the modulator elements, as shown in FIG. 4e. Since the sacrificial layer is the amorphous silicon and doped amorphous silicon in one embodiment, this is also patterned and etched as part of the transistor formation process. Posts may be formed out of the same material used to planarize the thin film transistor structures such as polymer 52 in FIGS. 3f and 4f. Currently, the posts of the modulators are formed from a metal layer, either the metal of the membrane of FIG. 1a or the metal of the supports of FIG. 1b. However, there is no requirement to use metal for the posts. Using a polymer allows the planarization of the transistors to be done in parallel with the formation of the posts. An example of a polymer would be polyimide.

Figure 3G:
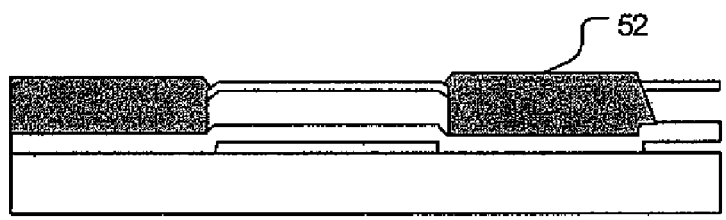
Figure 3H:
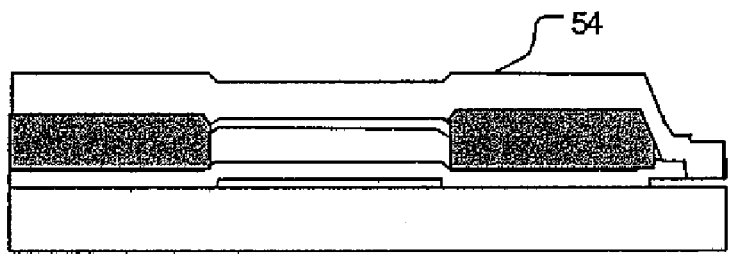
Figure 4G:
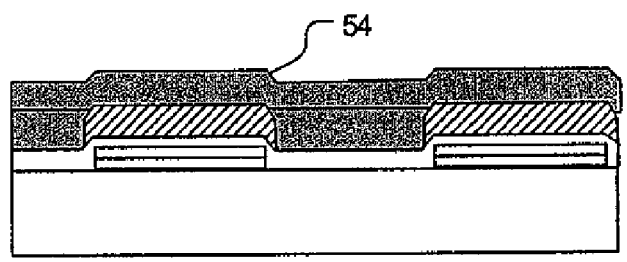

FIG. 3g appears similar to FIG. 3f because the processing performed is not seen by the side view. In FIG. 3g, the planarization layer would be patterned and etched to clear the transistor leads. This clears the way for the metal contacts to be made with the deposition of the metal layer 54 in FIGS. 3h and 4g. This metal forms the mirror layer 20 in FIG. 1a and the mirror element 24 in FIG. 1b. It will also form the sources and drain electrodes for the transistors. It must be noted that in the architecture of FIG. 1a, the metal layer 54 is the mirror layer and the mechanical layer, the layer that moves. In the architecture of FIG. 1b, the layer 54 is the mirror layer and the post layer 52 is the mechanical layer.

Figure 3I:
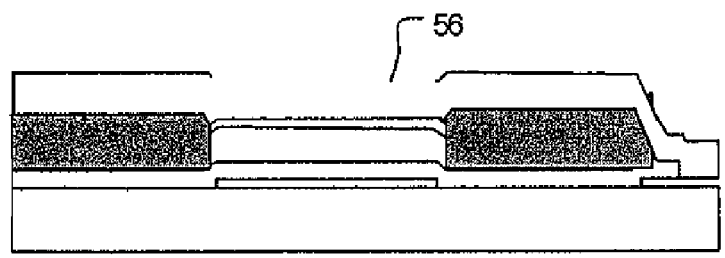
Figure 3J:
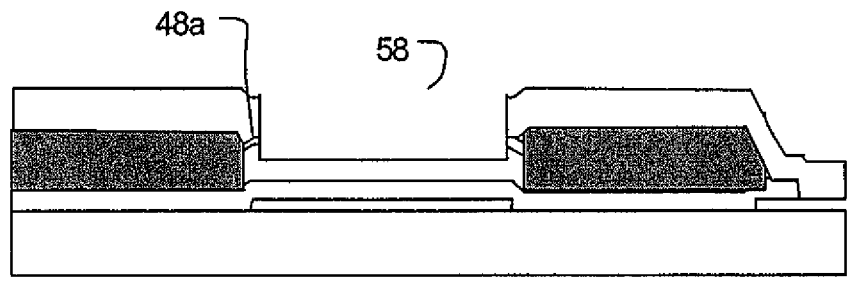

The metal layer 54 is patterned and etched to form the source and drain electrodes as well as form the individual movable elements for the modulator in FIGS. 3i. The gap 56 is formed by the etching process performed on the metal layer. The doped amorphous silicon layer 48a is then etched again in FIG. 3j, using the source/drain electrode metal as a mask, to form the channel for the transistors. There is no equivalent process for the modulator element for this or the remaining transistor processes.

Figure 3K:
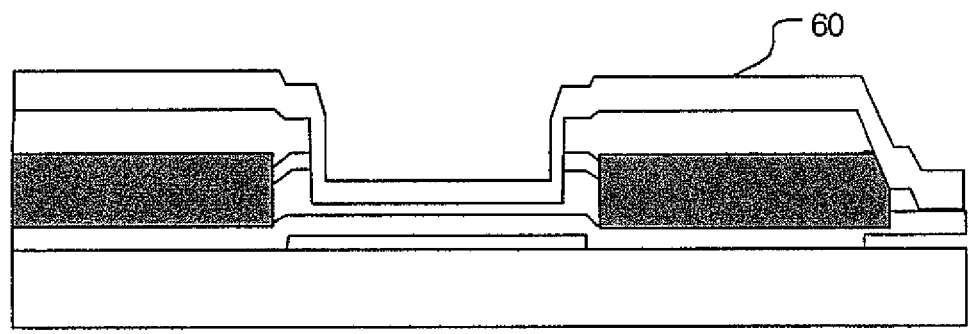
Figure 3L:
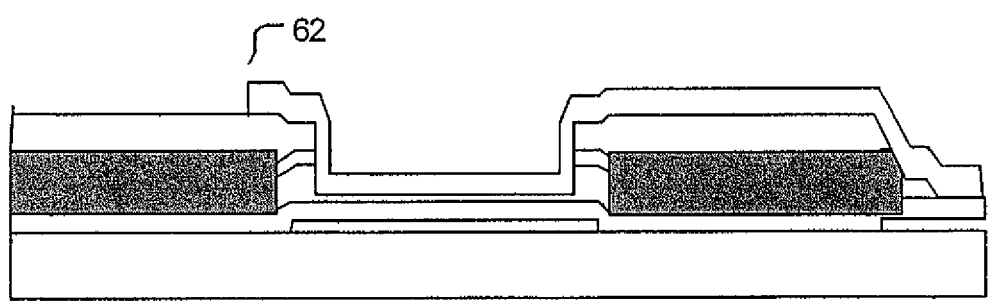
Figure 4H:
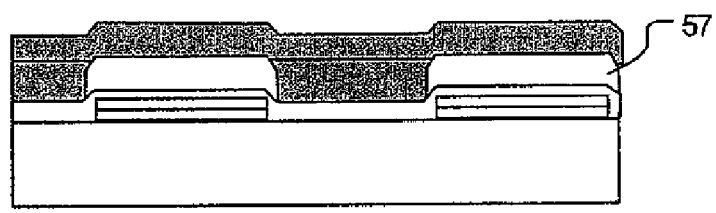

The final two processes for the transistor formation are show in FIGS. 3k and 3l. In 3k, a passivation layer 60 is deposited for the transistors. In FIG. 3l, the passivation layer is etched to clear leads, such as by the gap show at 62. In one embodiment, the passivation layer is oxide. The transistor processing is then completed, upon which a release etch is performed to form gap 57 in FIG. 4h, allowing the modulator elements to move freely. In this manner, the manufacture of thin film transistors is accomplished nearly in parallel with the manufacture of a thin film, interferometric spatial light modulator.

For the modulator architecture of FIG. 1b, a second sacrificial layer would be deposited, followed by a second metal layer. The patterning and etching of the metal layer to form the support posts and then the etching of the sacrificial layer to free up the elements may be performed after the formation of the thin film transistors. The alteration of the processing for the architecture of FIG. 1b is more clearly set out in U.S. patent application Ser. No. 10/644,312, filed Aug. 19, 2003, "Separable Modulator Architecture." The process of manufacturing the thin film transistors is compatible with the manufacture of either architecture of the interferometric modulator array.

In addition, the manufacture of the transistors may use low-temperature polysilicon, either in a top gate or a bottom gate structure. These processes will be demonstrated with the separable modulator architecture of FIG. 1b, but could also apply to the architecture of FIG. 1a. The selection of the modulator architecture is independent of the selection of the type of transistors used, and the integration process is adaptable to the different, possible combinations.

Figure 5A:
FIGS. 5a-5r show embodiments of an integrated process flow for an interferometric modulator having low-temperature polysilicon, top gate transistors.
Figure 5B:
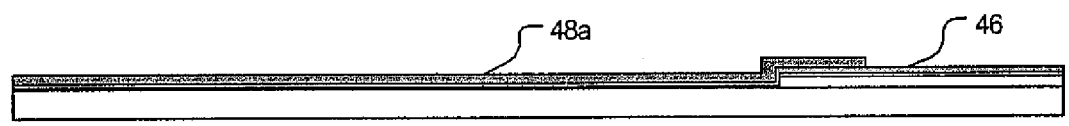
Figure 5C:
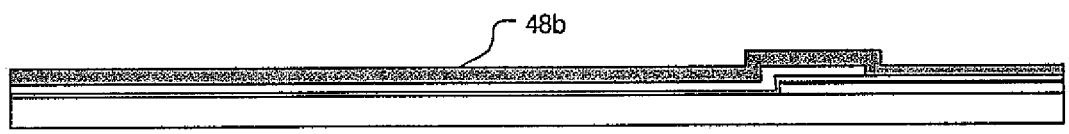
Figure 5D:
Figure 5E:
Figure 5F:
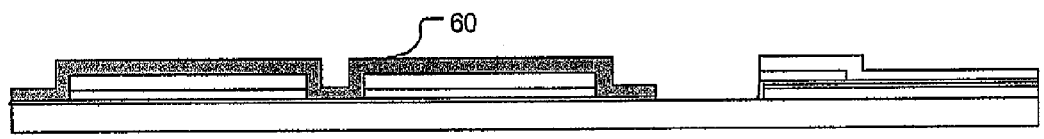
Figure 5G:
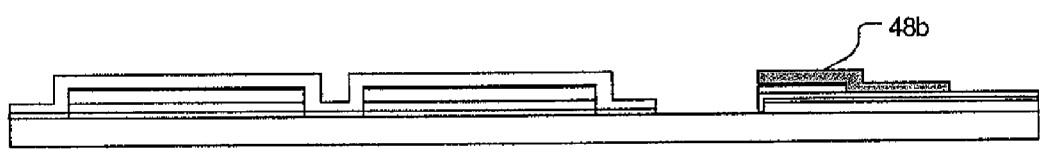
Figure 5H:
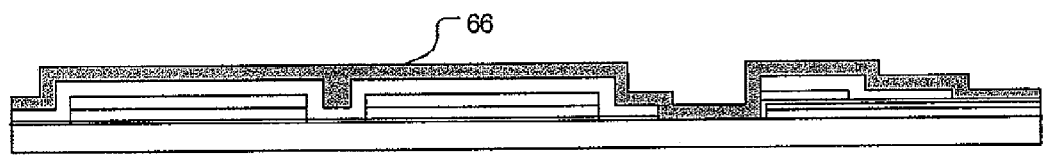
Figure 5I:
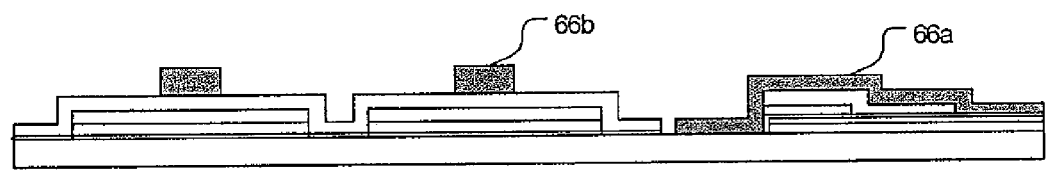
Figure 5J:
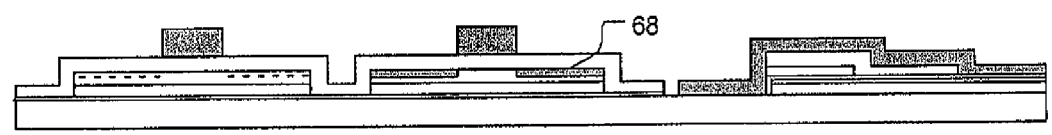
Figure 5K:
Figure 5L:
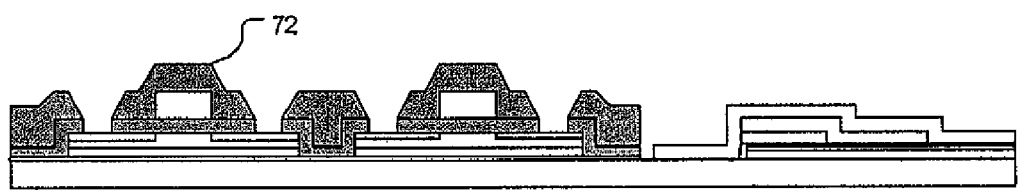
Figure 5M:
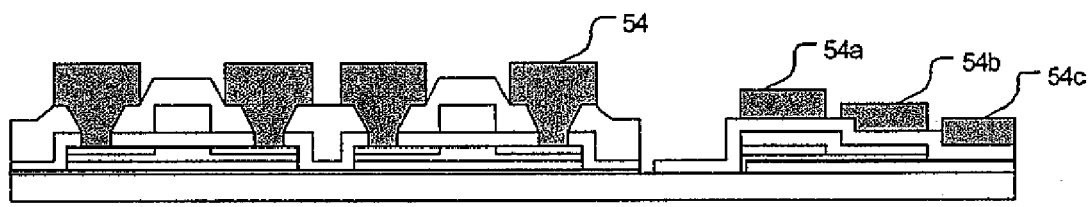
Figure 5N:
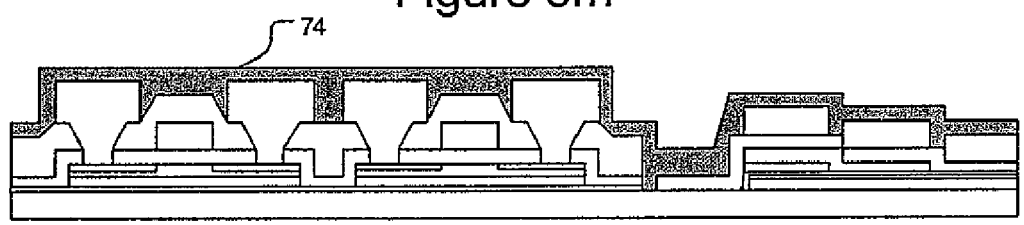
Figure 5O:
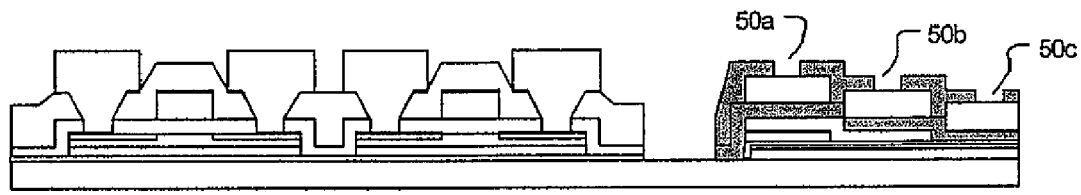
Figure 5P:
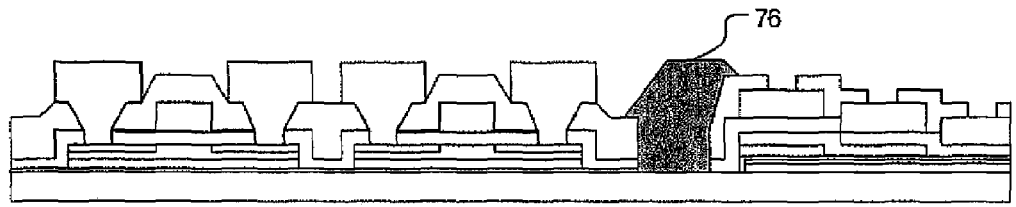
Figure 5Q:
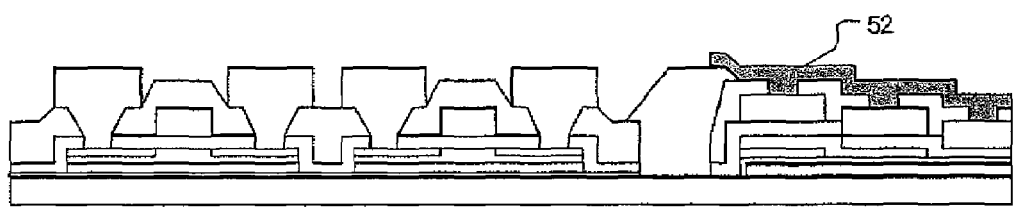
Figure 5R:
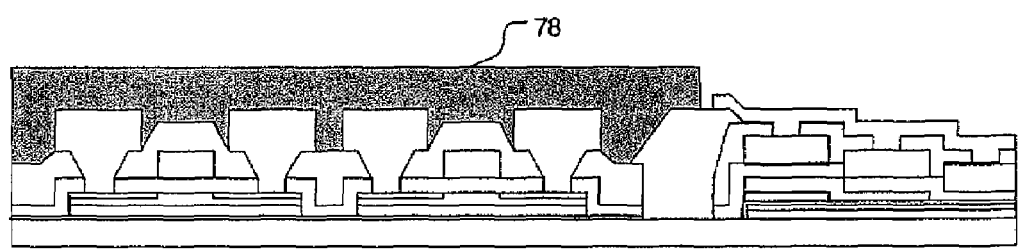

FIGS. 5a-5r show embodiments of a process flow for a top-gate, low-temperature, polysilicon transistor flow integrated with the process flow for an interferometric modulator. The transistor flow and the modulator flow are shown side-by-side on what appears to be the same portion of the substrate, but that is just for ease of demonstration and is not intended to imply any particular location for the modulator array relative to the transistor array.

In FIG. 5a, the optical stack 42 is deposited on the substrate 40. In FIG. 5b, the oxide 46 and the first portion 48a of the first sacrificial layer 48 is deposited, masked and etched. If FIG. 5c, the second portion 48b is deposited. In FIG. 5d, the layers are patterned and etched to form the basic structures for the modulator as well as the transistors. The structure to the right of the diagram is one element of an interferometric modulator array, used to show the integration of the two process flows.

In FIG. 5d, the n-channel mask for the transistor is deposited to allow for n-channel doping. A gate oxide 60 is then deposited. The oxide is then patterned and etched to obtain the resulting structures in FIG. 5f. In FIG. 5g, the second portion 48b of the sacrificial layer has been patterned and etched to form underlying structures for the modulator element. In FIG. 5h, the gate molybdenum is deposited at 66. This is patterned and etched to form the structures such as 66a and 66b in FIG. 5i.

In FIG. 5j, the p source and drain are doped using a mask, resulting in doped p source and drain 68. A similar process is performed for the n source and drain 70 in FIG. 5k. In FIG. 5l, the interlayer dielectric 72 is deposited over the transistor structures. No comparable processes are being performed on the modulator element at this point.

In FIG. 5m, the mirror layer 54 is deposited to be used by the transistors as the source/drain contacts, and the modulator as the mirrors 54a, 54b and 54c. This resumes the integrated processing flow. In FIG. 5n, a sacrificial layer 74 is deposited, which will provide support for the mirror supports and then be removed to allow the mirror elements to move freely. The sacrificial layer 74 will not be used by any transistor processes, but the transistors may require that the material remain compatible with the processes in the transistor flow.

In FIG. 5o, the sacrificial layer 74 has been cleared from the transistor region and has been patterned and etched to form post holes 50a, 50b and 50c. A planarization layer 76 is deposited in FIG. 5p. The mechanical layer 52 is then deposited in FIG. 5q to form the support posts for the mirrors. The transistor region then received a passivation layer in FIG. 5r.

Figure 6B:
FIGS. 6a-6n show embodiments of an integrated process flow for an interferometric modulator having low-temperature polysilicon, bottom gate transistors.
Figure 6C:
Figure 6D:
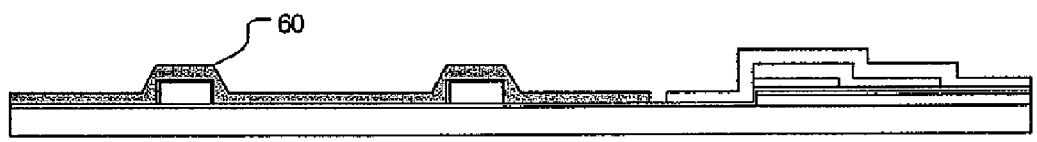
Figure 6E:
Figure 6F:
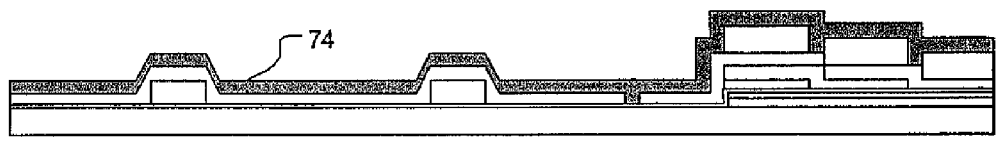
Figure 6G:
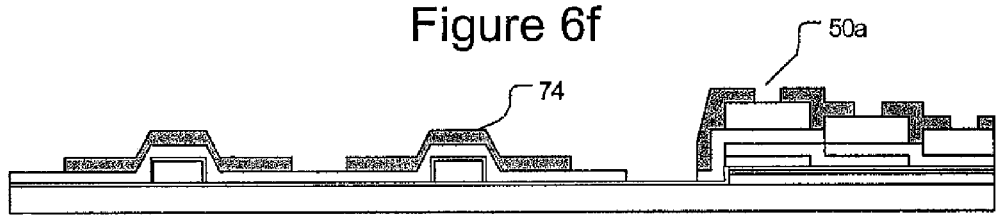
Figure 6H:
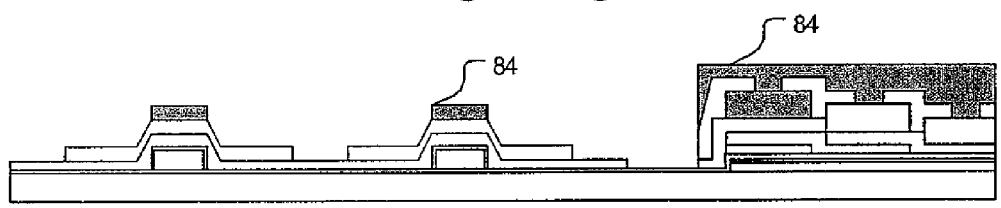
Figure 6I:
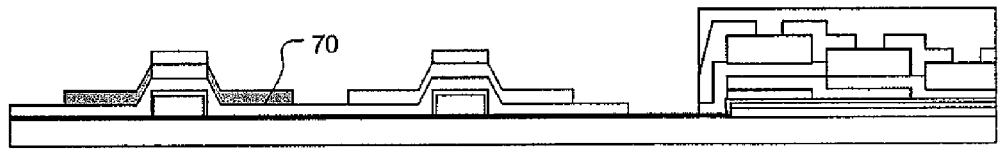
Figure 6J:
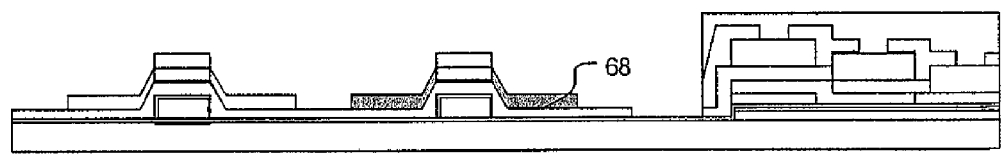
Figure 6K:
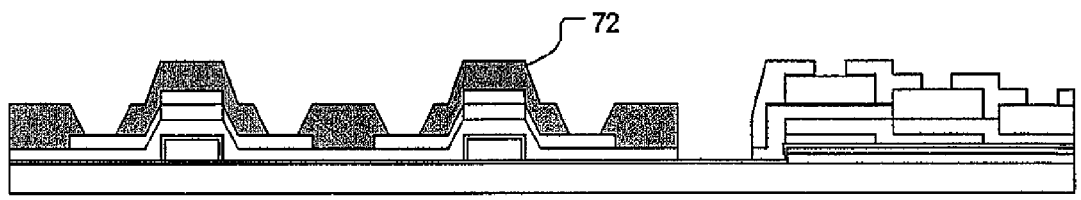
Figure 6L:
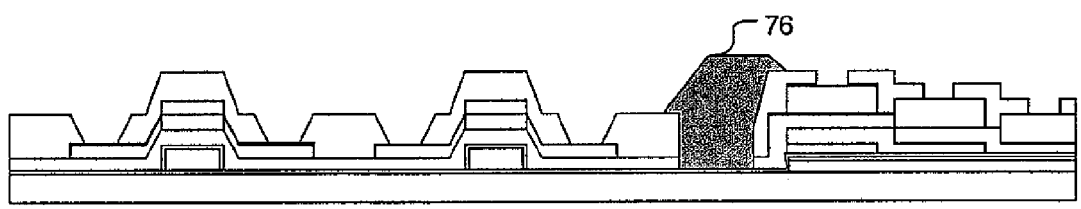
Figure 6M:
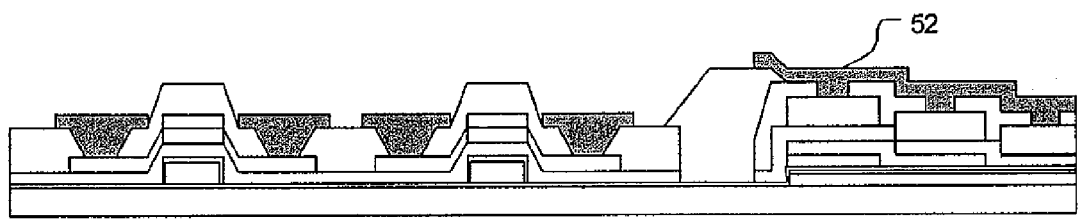
Figure 6N:
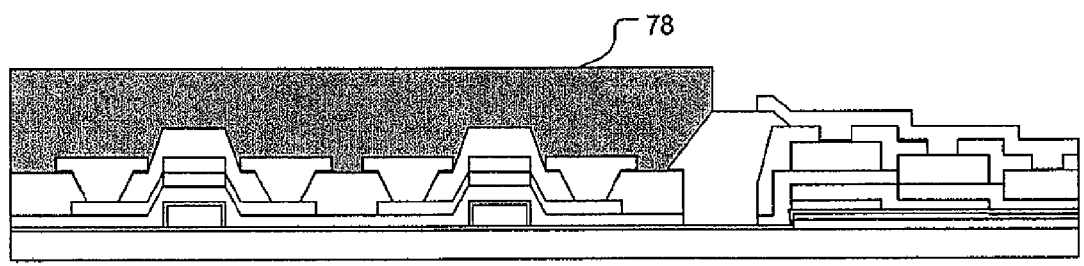

FIGS. 6a-6n show similar processes as FIGS. 5a-5r, but for a bottom gate, low-temperature, polysilicon transistor array. Similar structures and layers use the same reference numbers between the two for easier comparison. In FIG. 6a, the optical stack 42 for the modulator is deposited on the substrate 40. The two portions of the first sacrificial layer 48 are deposited, patterned and etch in FIG. 6b to form underlying structures for the modulator. In FIG. 6c, the gate metal 80 is deposited, patterned and etch and then the oxidation layer 82 is formed. The gate oxide is deposited in FIG. 6d.

In FIG. 6e, the mirror layer 54 is deposited, patterned and etched to form the mirrors form the modulator element, mirrors 54a, 54b and 54c. In FIG. 6f, the sacrificial layer 74 is deposited, and FIG. 6g, the post holes such as 5a is formed, with sacrificial islands of layer 74 left on the transistor structures. In FIG. 6h, an oxide layer is deposited and then patterned and etched to form oxide caps for the transistor structures.

In FIG. 6i, the n-type source and drain are doped as shown by 70, and the p-type source and drain are doped as shown by 68 in FIG. 6j. In FIG. 6k, the interlayer dielectric 72 is deposited. The planarization layer 76 is deposited in FIG. 6l. In FIG. 6m, the mechanical layer 52 is deposited that forms the posts in the post holes, and provides the source/drain contact metal for the transistors. In FIG. 6n, the passivation layer 78 is deposited.

In this manner, a process flow may be provided that integrates the manufacturing of the transistors and the interferometric modulator on one substrate. This integrated process flow saves processing steps, thereby reducing costs, and allows for faster processing of the devices. Faster processing of the device increases the output of devices, thereby also reducing costs.

Figure 7:
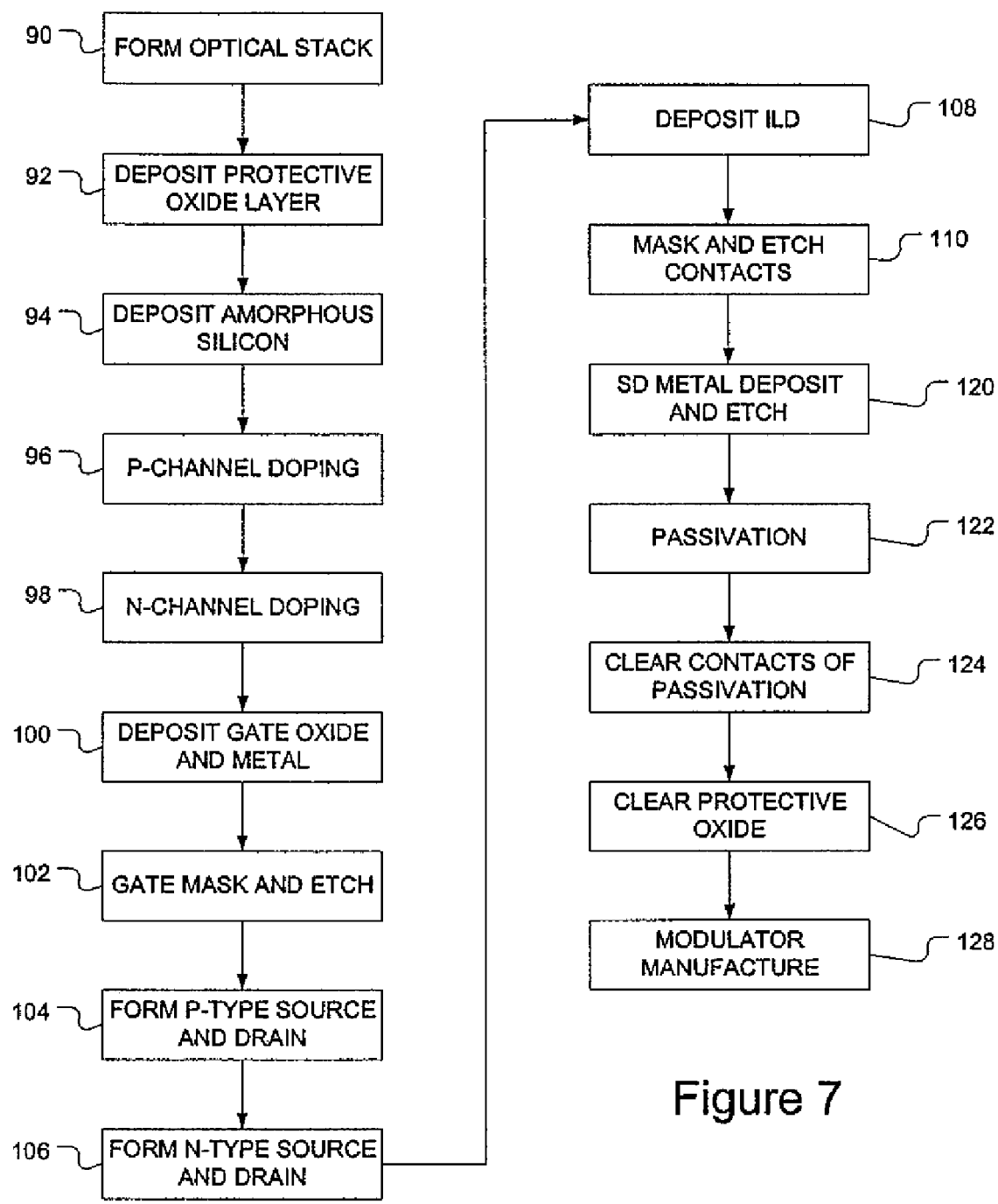
FIG. 7 shows a flowchart of an embodiment of a method to manufacture interferometric modulators in series with manufacture of polysilicon, top gate transistors.

In addition, it may be desirable to perform the processing in series. In one example, the circuit component processing is performed first, then the processing for the interferometric modulator. In another example, the ordering is switched. An example of the circuit component being manufactured first is shown in FIG. 7. The process starts with the transparent substrate.

At 90, the optical stack is formed by deposition, patterning and etching of the electrode layer, the optical layer and the dielectric. At 92, the structures formed at covered with a protective oxide layer. At this point, the process flow concentrates on manufacture of the thin film circuit components. In this particular example, the component is a top gate, low-temperature, polysilicon transistor.

The amorphous silicon is deposited at 94, with p-channel doping occurring at 96, and n-channel doping at 98. The gate oxide and metal are deposited at 100, and the gate masked and etched at 102. It must be noted that several processes have been; compressed for ease of discussion. The more detailed descriptions of these processes can be found in the discussion with regard to FIGS. 3-6. The p-type source and drain are formed at 104, and the corresponding n-type source and drain are formed at 106.

The interlayer dielectric is deposited at 108, and the contacts are masked and etched to clear them at 10. The source and drain metal is deposited and etched. Passivation of the circuit component occurs at 122, with the contacts being cleared of the passivation material at 124. At this point, the circuit component processing has been substantially completed. At 126, the protective oxide previously deposited is cleared and the interferometric modulator manufacture process begins.

As mentioned above, this is just one example of a serial process flow. The modulator could be manufactured first and then the circuit component. A similar flow would occur for the circuit component, regardless of whether it is top or bottom gate, low-temperature polysilicon, other types of thin film transistors, or thin film diodes.

Thus, although there has been described to this point a particular embodiment for a method and apparatus for manufacture of thin film circuit components on the same substrate as an interferometric modulator, it is not intended that such specific reference be considered as limitations upon the scope of this invention except in-so-far as set forth in the following claims.

What is claimed is:

1. A method of manufacturing an interferometric modulator with film semiconductor circuit components, the method comprising:
    depositing a material layer over a transparent substrate; and
        patterning and etching the material layer to form a portion of at least one interferometric modulator element and a portion of at least one film semiconductor circuit component.

2. The method of manufacturing an interferometric modulator with film semiconductor circuit components according to claim 1, wherein patterning and etching comprises forming a first terminal of at least one film semiconductor circuit component and an optical stack of at least one interferometric modulator element.

3. The method of manufacturing an interferometric modulator with film semiconductor circuit components according to claim 1, wherein the material layer comprises an oxide layer, and wherein the patterning and etching comprises forming an oxide for the at least one film semiconductor circuit component and a dielectric for the at least one interferometric modulator element.

4. The method of manufacturing an interferometric modulator with film semiconductor circuit components according to claim 3, wherein the oxide layer is optically transparent.

5. The method of manufacturing an interferometric modulator with film semiconductor circuit components according to claim 1, wherein the material layer is a sacrificial layer comprising an amorphous silicon layer and a doped amorphous silicon layer, and wherein patterning and etching comprises forming post holes of the interferometric modulator element and a semiconductor layer of the at least one film semiconductor circuit component.

6. The method of manufacturing an interferometric modulator with film semiconductor circuit components according to claim 1, wherein the material layer is a polymer planarization layer, and wherein patterning and etching comprises forming posts of the at least one interferometric modulator element and exposing a predetermined portion of the at least one film semiconductor circuit component for further processing.

7. The method of manufacturing an interferometric modulator with film semiconductor circuit components according to claim 6, wherein the polymer is polyimide.

8. The method of manufacturing an interferometric modulator with film semiconductor circuit components according to claim 1, wherein the material layer is a metal layer, and wherein patterning and etching comprises forming a mirror element of the at least one interferometric modulator element and an electrode of the at least one film semiconductor circuit component.

9. The method of manufacturing an interferometric modulator with film semiconductor circuit components according to claim 1, wherein the at least one film semiconductor circuit component comprises a film transistor; a low-temperature, polysilicon, top gate transistor; a low-temperature, polysilicon, bottom gate transistor; or a film diode.

* * * * *